Patented Oct. 7, 1952

2,613,224

UNITED STATES PATENT OFFICE 2,613,224

PROCESS FOR MAKING PHOSPHORAMIDES

Marvin Paulshock, Wilmington, Del., assignor to E. I. du Pont de Nemours & Company, Wilmington, Del., a corporation of Delaware No Drawing. Application March 20, 1950, Serial No. 150,820

3 Claims. (Cl. 260—545)

This invention relates to methods for the preparation of phosphoramides. More particularly it relates to processes in which phosphoramides are prepared by reacting tetraalkyl diamidophosphoryl halide with metallic sodium.

The tetraalkyl diamidophosphoryl halides employed in the processes of this invention are represented by the formula:

(1) 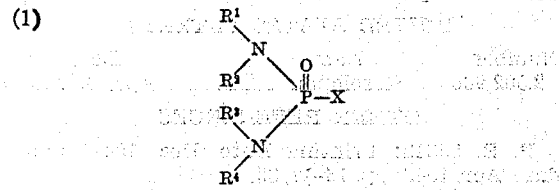

where $R^1$, $R^2$, $R^3$ and $R^4$ are lower alkyl, that is, alkyl groups containing from 1 thru 5 carbon atoms, such as methyl, ethyl, propyl, butyl and amyl, and X is chlorine or bromine.

The processes of the invention are carried out by bringing together one of the above phosphoryl halides and metallic sodium. Preferably the reaction is carried out in the presence of an inert solvent such as benzene, toluene, xylene, decane, petroleum ether, dibutyl ether, decalin or cyclohexane.

The phosphoryl halide and the sodium are reacted in equimolar quantities. The sodium used in the processes of the invention may be employed in any convenient form, preferably in a finely divided state or molten.

In carrying out the processes of the invention, the phosphoryl halide may be added to sodium gradually or vice versa. The temperature is not critical within reasonable limits. Preferably the temperature is maintained from 50 to about 150° C. The rate of reaction increases with increase in temperature. Also, the more finely divided the sodium the more rapid the reaction rate.

Sodium halide is formed in the reaction and remains suspended in the reacting mixture. At the completion of the reaction the sodium halide is removed by filtration or other conventional means. If a solvent has been used in carrying out the reaction, it is removed by distillation preferably at reduced pressure.

The products obtained by the process are pale yellow to red colored oils. The lower molecular weight products are completely miscible with water and the water solubility decreases as molecular weight increases.

The products obtained by the processes of the invention have valuable insecticidal properties and are particularly useful as systemic aphicides.

The processes of the invention are illustrated by the following examples:

Example I 2.3 grams of metallic sodium is added to 75 cc. of dry toluene under reflux. The sodium metal melts and the mixture is stirred vigorously to disperse the molten sodium thruout the toluene. The mass is then cooled somewhat and the suspension is stirred vigorously at 90 to 95° C. as 17 grams of tetramethyl diamidophosphoryl chloride is added dropwise over a period of ten minutes. The reaction mixture rapidly turns dark blue as the diamidophosphoryl chloride is added.

At the completion of the diamidophosphoryl chloride addition, the reaction mixture is stirred for two hours still maintaining the temperature at 90 to 95° C. It is then filtered to remove suspended sodium chloride. Solvent toluene is removed by distilling under reduced pressure.

There remains as product 13 grams of undistilled materials. The product is a light orange colored liquid. It boils at 120–140 at 0.9 mm. Hg., has a molecular weight of approximately 300, and a refractive index $n_D^{20}$ 1.4738.

Example II 2.3 grams of metallic sodium are added to 125 cc. xylene. The xylene is heated to about 125° C. with vigorous agitation and the sodium melts therein and is dispersed thruout the xylene.

27.1 grams of N-isoamyl-N-methyl-N'-dimethyl phosphoryl bromide are added slowly over a fifteen minute period to the dispersion of sodium in xylene maintaining the temperature at about 100° C. After completing addition of phosphoryl bromide, the reaction mixture is stirred for an additional two hours maintaining the temperature at about 100° C. Sodium bromide formed in the reaction is removed by filtration.

The solvent xylene is removed by distillation at reduced pressure leaving the product undistilled. 18.5 grams of product are obtained. The product is a red oil.

Example III 22.6 grams of tetraethyl diamidophosphoryl chloride are heated to about 110° C. with agitation. 2.3 grams of metallic sodium in small pieces are added to the phosphoryl chloride over a period of one-half hour keeping the temperature at about 110° C. Sodium chloride formed in the reaction is then removed by filtration.

Example IV

N - isopropyl - N - methyl - N' - isopropyl-N'-methyl diamidophosphoryl chloride (22.6 grams) are added 115 cc. dioxane. The resulting solution is heated to reflux temperature at atmospheric pressure. 2.3 grams of metallic sodium are then added in small pieces over a period of twenty minutes maintaining vigorous agitation and keeping the reacting mass at reflux temperature. Following the sodium addition, the reaction mixture is stirred for an additional one and one-half hours. The suspended sodium chloride formed in the reaction is removed by filtration. The solvent dioxane is removed by distillation under vacuum.

18 grams of product remained undistilled. The product is a light red oil.

I claim:

1. A process for making an oil having useful insecticidal properties which comprises mixing and heating metallic sodium and a compound represented by the formula

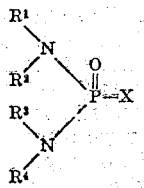

where $R^1$, $R^2$, $R^3$ and $R^4$ are each an alkyl group containing from 1 thru 5 carbon atoms and X is a halogen selected from the group consisting of chlorine and bromine.

2. A process for making an oil having useful insecticidal properties which comprises mixing and heating, in an inert solvent, metallic sodium and a compound represented by the formula

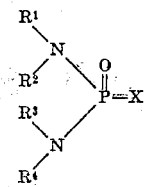

where $R^1$, $R^2$, $R^3$ and $R^4$ are each an alkyl group containing from 1 thru 5 carbon atoms and X is a halogen selected from the group consisting of chlorine and bromine, removing solid sodium halide formed, and recovering the product oil.

3. A process for making an oil having useful insecticidal properties which comprises bringing together in an inert solvent with agitation and heating substantially equimolar proportions of metallic sodium and tetramethyl diamidophosphoryl chloride, removing solid sodium chloride formed, and recovering the product oil.

MARVIN PAULSHOCK.

REFERENCES CITED

The following references are of record in the file of this patent:

UNITED STATES PATENTS

| Number | Name | Date |
|---|---|---|
| 2,502,966 | Kosolapoff | Apr. 4, 1950 |

OTHER REFERENCES

P. B. 95312; Printing Date, Dec. 1947; pub. date, Apr. 1949; pp. 16–17, 35.